United States Patent [19]

Hirt et al.

[11] Patent Number: 4,926,715
[45] Date of Patent: May 22, 1990

[54] PLANETARY GEAR TRAIN

[75] Inventors: Manfred Hirt; Heinrich Arndt, both of Augsbury, Fed. Rep. of Germany

[73] Assignee: Zahnraderfabrik Renk AG, Fed. Rep. of Germany

[21] Appl. No.: 519,763

[22] PCT Filed: Feb. 14, 1983

[86] PCT No.: PCT/EP83/00034
§ 371 Date: Jul. 29, 1983
§ 102(e) Date: Jul. 29, 1983

[87] PCT Pub. No.: WO83/02810
PCT Pub. Date: Aug. 18, 1983

[30] Foreign Application Priority Data

Feb. 13, 1982 [DE] Fed. Rep. of Germany ....... 3205208

[51] Int. Cl.[5] ............................................. F16H 57/10
[52] U.S. Cl. ..................................... 475/337; 74/410;
475/331; 475/344; 475/346
[58] Field of Search ................. 74/768, 769, 797, 801,
74/410, 409, 785, 760, 763

[56] References Cited

U.S. PATENT DOCUMENTS

| | | | |
|---|---|---|---|
| 2,218,838 | 10/1940 | Alspaugh | 74/801 X |
| 3,062,073 | 11/1962 | Brass | 74/801 X |
| 3,289,488 | 12/1966 | Brever | 74/801 X |
| 3,315,546 | 4/1967 | Fritsch | 74/801 |
| 3,352,178 | 11/1967 | Lindgren et al. | 74/801 |
| 3,812,739 | 5/1974 | Mori et al. | 74/763 |
| 3,854,349 | 12/1974 | Michling | 74/801 |
| 3,958,465 | 5/1976 | Hiersig et al. | 74/410 |
| 4,089,238 | 5/1978 | Forster et al. | 74/763 X |
| 4,158,971 | 6/1979 | Szalai et al. | 74/801 |
| 4,158,972 | 6/1979 | Chamberlain | 74/801 |
| 4,173,906 | 11/1979 | Altenbokum et al. | 74/801 X |
| 4,237,750 | 12/1980 | Takahashi | 74/410 X |
| 4,395,925 | 8/1983 | Gaus | 74/763 |
| 4,420,992 | 12/1983 | Windish | 74/760 X |

FOREIGN PATENT DOCUMENTS

| | | |
|---|---|---|
| 2850099 | 5/1979 | Fed. Rep. of Germany ........ 74/768 |
| 1249299 | 11/1960 | France . |
| 2372999 | 6/1978 | France . |
| 34215 | 12/1964 | German Democratic Rep. . |
| 203107 | 9/1923 | United Kingdom . |
| 879040 | 10/1961 | United Kingdom . |
| 1546915 | 5/1979 | United Kingdom . |
| 2033530 | 5/1980 | United Kingdom . |

OTHER PUBLICATIONS

"Anordnung mehrerer Umlaufrader bei Planetengetrieben", Bruno, Meier, *Konstrukion*, 3/10/61, pp. 67–69.

*Primary Examiner*—Dwight G. Diehl
*Attorney, Agent, or Firm*—Larson and Taylor

[57] ABSTRACT

A planetary gear train comprising at least two planetary gear sets arranged coaxially behind, and drivingly connected with, one another, of which one planetary gear set (5) contains fewer, and the other planetary set (17) more, planet gears (7) and the planet gears and their bearings in both planetary gear sets are identically constructed. The pitch diameter of the sun gear (16) and the pitch diameter of the ring bear (18) of the other planetary gear set (17) are larger than in one planetary gear set (5), and both sets (5, 17) are constructed for approximately the same line loading of the sun gears, planet gears, and ring gears (force per face width in the contact line of two teeth which bear against each other). Thus, a gear unit is obtained which has a smaller cross section with up to 50% savings in weight.

4 Claims, 1 Drawing Sheet

PLANETARY GEAR TRAIN

The invention relates to a planetary gear train of the type having at least two planetary gear sets arranged coaxially one behind the other and drivingly connected with one another, wherein each gear set comprises a sun gear, a ring gear and a plurality of intermediate planet gears.

More particularly, the invention is concerned with a planetary gear train having two planetary gear sets arranged coaxially, one behind the other, and drivingly connected with one another. In this type of prior art planetary gear train, both planetary gear sets have the same number of planet gears. If both planetary gear sets are designed for the transmission of the same driving power, then the planet gear cone running at a lower r.p.m. must nevertheless, because of the resulting high torques, be constructed for a higher load and, thus, more strongly. In prior art gearings, this is achieved by using planet gears with a large cross section or large width or large diameter and large width and correspondingly large sun gears and large ring gears. This leads to large and heavy, as well as more expensive, gearings, because the price is essentially determined by the weight. Due to the need for stable construction, it is not possible to provide the sun gears with axial through-holes through which additional components could be passed.

The object of the invention is to provide planetary gear trains of the type mentioned above which are lighter and smaller, as well as less expensive and more versatile in use.

This object is solved by a combination of features wherein, in a planetary gear train of the type described, one of the sets contains less planet gears than the other set, all planet gears of both sets and their respective bearings are constructed identical to each other, each planetary gear set is arranged in a transverse plane perpendicular to the common axis of the planetary gear train, the pitch diameter of the sun and ring gears of the planetary gear set having more planet gears being larger than the corresponding pitch diameter of the other set, and wherein both sets are designed for approximately the same line loading. The invention can lead to savings of up to 50% in weight compared with prior art planetary gear trains. Furthermore, the sun gears of the planetary gear sets can be provided with axial through-holes, because the sun gears have a sufficiently large diameter and, as a result of the force distribution over a large number of gears than is customary in gearings of known construction, a through-hole does not adversely weaken the sun gear.

One embodiment of the invention is shown in the accompanying drawing given by way of illustrative example and will be described below, wherein.

Figure 1:
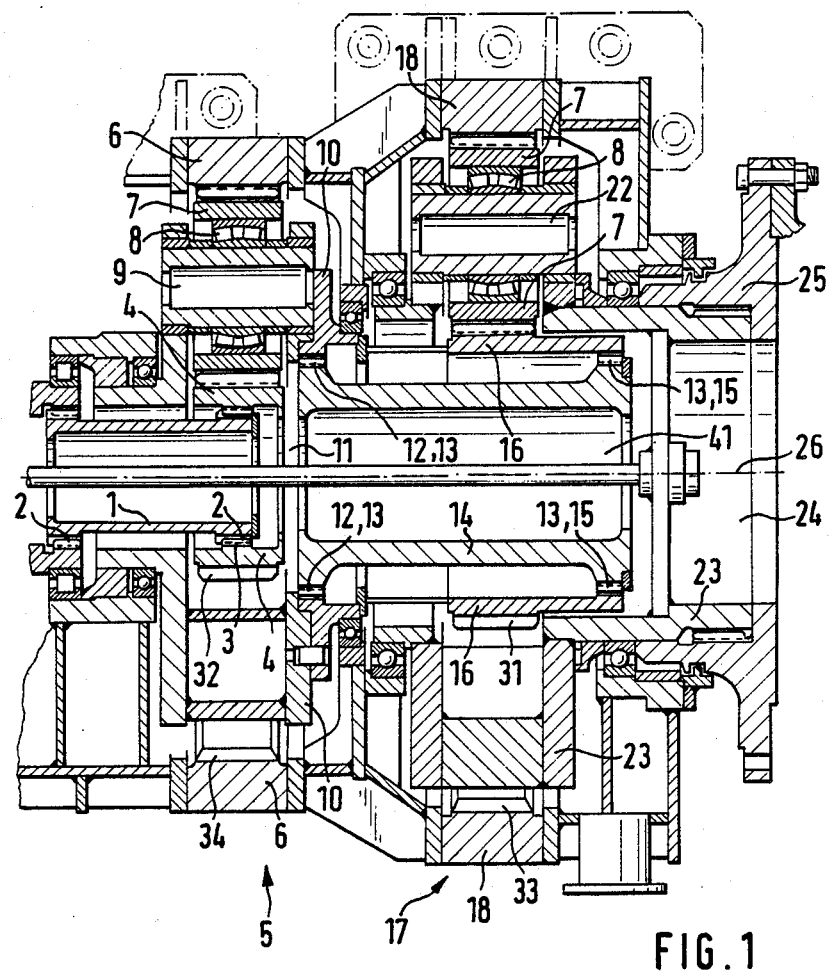
FIG. 1 is an axial section through a gear train embodying the invention.

On the driving side of the planetary gear train, one of two gear rims 2 of a tubular clutch piece 1 engages with internal toothing 3 of the hollow sun gear 4 of a planetary gear set 5. Planet gears 7 are provided between this sun gear 4 and a ring gear 6 of the planetary gear set 5. These planet gears 7 are pivotally mounted by means of a self-aligning radial roller bearings 8 on bearing pins 9 of a (planetary gear carrier 10.

The carrier 10 of one planetary gear set 5 has an axial through-hole 11 with internal toothing 12 in which engages one gear rim 13 of a tubular clutch piece 14 of a double articulated gear-tooth clutch, the other gear rim 13 of which engages in the internal toothing 15 of a sun gear 16 of another planetary gear set 17, and which is provided with an axial through-hole. The planetary gears 7 of this other planet gear set 17 are in mesh with the external toothing of the sun gear 16 and with the ring toothing of the internal gear 18 of this set 17. The planet gears 17 of this set 7 are pivotally mounted by means of self-aligning radial roller bearings 8 on bearing pins 22 of a planetary gear carrier 23 of this set 17. This carrier is provided with an axial through-hole 24 and, on its driven side, with a hollow flange 25 for connection to a machin which is to be driven.

The planet gears 7 and the self-aligning radial roller bearings 8 in both planetary gear set 5 and 17 have the same construction. Both in set 5 and in set 17 the planet gears 7 are arranged in a common plane extending perpendicularly to the axis 26 of the gears. With respect to weight, size and cost, this construction is more advantageous than one in which, for example, two planet gears 7 are arranged axially behind one another in one planetary gear set, thus requiring sun and ring gears that are essentially twice as wide as in the case of the invention. One planetary gear set 5 contains fewer planet gears 7 than planetary gear set 17. Preferably, as in the case of the embodiment illustrated in the drawings, one planetary gear set 5 has three, and the other planetary gear set 17 six, planetary gears 7. In planet gear cone 17, greater forces must be transmitted than in set 5 on account of the lower r.p.m. However, by using a correspondingly greater number of planet gears 7 in set 17 than in set 5, the same tooth loading of the individual teeth can essentially be achieved. In this way, in both sets 5 and 17 the same planet gears 7 and the same bearings 8 can be used, thus enabling a more rational and less expensive fabrication and storing. Furthermore, the lighter load of a planet gear 7 has the advantage over the larger designs known in the prior art that even in the higher-load set 17 one can use self-aligning radial roller bearings 8 instead of cylindrical roller bearings. The external toothing 31 of the sun gear 16 has a larger pitch diameter than the external toothing 32 of the sun gear 4. Likewise, the internal toothing 33 of the ring gear 18 of the other set 17 has a larger pitch diameter than the ring toothing 34 of the internal gear 6 of set 5. Because of the use of a plurality of planet gears 7 in the other set 17 with a relaively small circle pitch, as in set 5, the ring gear 18 of the other set 17 also has only a slightly larger outside diameter than the ring gear 6 of set 5. Therefore, all this results in small outside diameters. On account of the likewise favorable, relatively large, diameter of the sun gears 4 and 16 and the driving forces in both cones 5 and 17 which are distributed over a large number of teeth, it is also possible to drill a through-hole 41 through the whole planetary gear train in order to save weight and to pass system components.

Preferably, sets 5 and 17 are so designed that in both sets there is approximately the same line loading of the gear teeth. Line loading is the force per face width in the line of contact between two adjoining teeth. In this way, both sets 5 and 17 can be loaded to a maximum, so that the greatest power can be transmitted with minimum structural dimensions. In practice, there is a slight departure from this identical loading capability because, for safety reasons, it is desirable to make the next to the last set 5 slightly stronger than the last cone 17.

Figure 2:
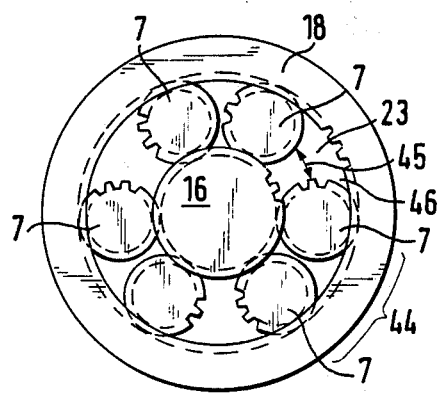
FIG. 2 is a schematic front view of the large planetary gear set.

Very small dimensions and large gear ratios with great driving powers can be achieved whenever, in the manner indicated above, one set 5 contains three, and the other set 17 six, planet gears 7 and, moreover, in this set 17 the planet gears 7 are arranged in groups of two planet gears 7 each, whereby the planet gears 7 of each group 44 are arranged very close to each other, whereas between neighboring groups 44 the planet gears 7 are spaced a relatively great distance 45 from each other, as shown in FIG. 2. Thus, the carrier 23 between neighboring groups 44 of planet gears in a circumferential direction has relatively large material cross sections 46, which impart sufficient rigidity to the satellite carrier 23 even if a relatively large number of planet gears 7 are used.

We claim:

1. A planetary gear train comprising at least two planetary gear sets arranged coaxially, one behind the other, and drivingly connected with one another, each planetary gear set having a sun gear, a stationary ring gear and a plurality of planet gears, said plurality of planet gears being between and engaging their respective sun and ring gears, each of said sun and ring gears having teeth lying on a pitch circle having a pitch diameter, one of sid planetary gear sets containing less planet gears than the other planetary gear set, the planet gears of both planetary gear sets and their respective bearings being identical to each other, the planet gears of said one planetary gear set being arranged in a first lateral plane transverse to the common axis of the planetary gear train and the planet gears of the said other planetary gear set arranged in another lateral plane transverse to the common axis of the planetary gear train, the said pitch diameter of the sun gear and of the ring gear of the said other planetary gear set being larger than the pitch diameter of the sun gear and ring gear, respectively, of the said one planetary gear set with less planet gears, and wherein said sun gears and said ring gears have the same strength and thus both sets are designed to approximately the same line loading of the teeth of the sun gears, planet gears and ring gears, wherein line loading is defined as the force per face width in the contact line of two teeth bearing against each other.

2. The planetary gear train according to claim 1, wherein said one planetary gear set has three planet gears and the said other planetary gear set has six planet gears.

3. The planetary gear train according to claim 1, wherein the planet gears of the said other planetary gear sets are combined in groups of two, the distance between the two planet gears of each group being the same and smaller than the distance between neighboring groups.

4. The planetary gear train according to claim 1, including an axial through-hole passing centrally through said sun gears of both planetary gear sets.

* * * * *